(No Model.)  3 Sheets—Sheet 2.

J. F. APPLEBY.
HARVESTER REEL ADJUSTING MECHANISM.

No. 598,652. Patented Feb. 8, 1898.

Witnesses,

Inventor, (No Model.) 3 Sheets—Sheet 3.

J. F. APPLEBY.
HARVESTER REEL ADJUSTING MECHANISM.

No. 598,652. Patented Feb. 8, 1898.

Witnesses,

Inventor,

UNITED STATES PATENT OFFICE.

JOHN F. APPLEBY, OF CHICAGO, ILLINOIS, ASSIGNOR TO THE HARVESTER KING COMPANY, OF HARVEY, ILLINOIS.

HARVESTER-REEL-ADJUSTING MECHANISM.

SPECIFICATION forming part of Letters Patent No. 598,652, dated February 8, 1898.

Application filed March 31, 1896. Serial No. 585,852. (No model.)

*To all whom it may concern:*

Be it known that I, JOHN F. APPLEBY, of Chicago, Illinois, have invented certain new and useful Improvements in Harvester-Reel-Adjusting Mechanism, of which the following is a specification.

This invention relates to means for adjusting the reel of a harvester so as to adapt the machine to work in all conditions of grain; and to this end the reel has, in addition to the usual vertical adjustment, a forward-and-back or lateral adjustment, which will adapt it to work in long or short grain and in grain which is leaning toward or away from the sickle.

My improved mechanism is of such simple construction and arrangement that these adjustments may be all made quickly, with little labor, and without the necessity of the driver leaving his station or stopping the machine.

My improvements are shown as applied to a machine of the header type in which the grain-platform and cutting mechanism are arranged in front of the ground-wheels and the draft-animals are attached to a push-pole in the rear of the wheels.

Figure 1:
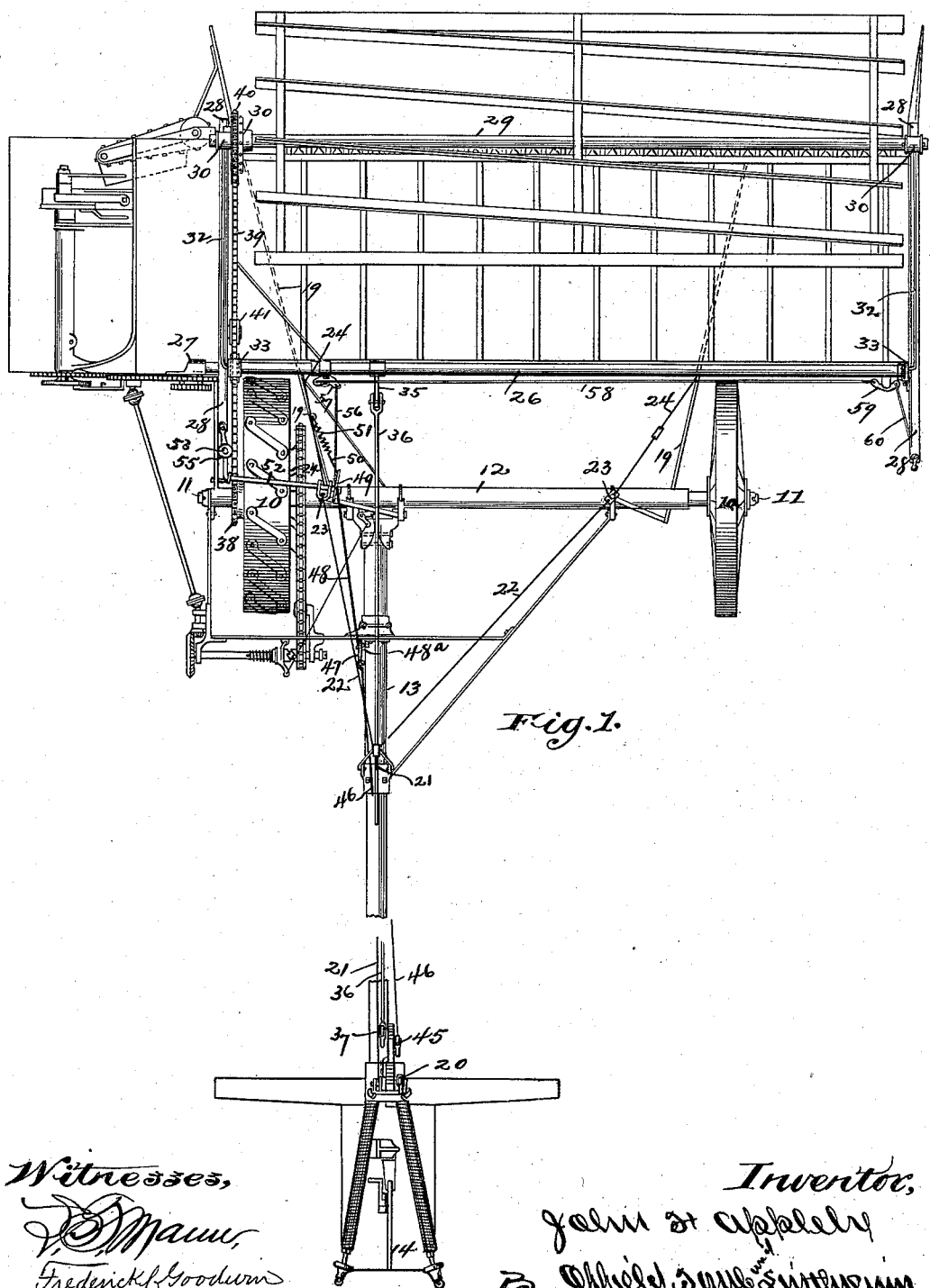
Figure 2:
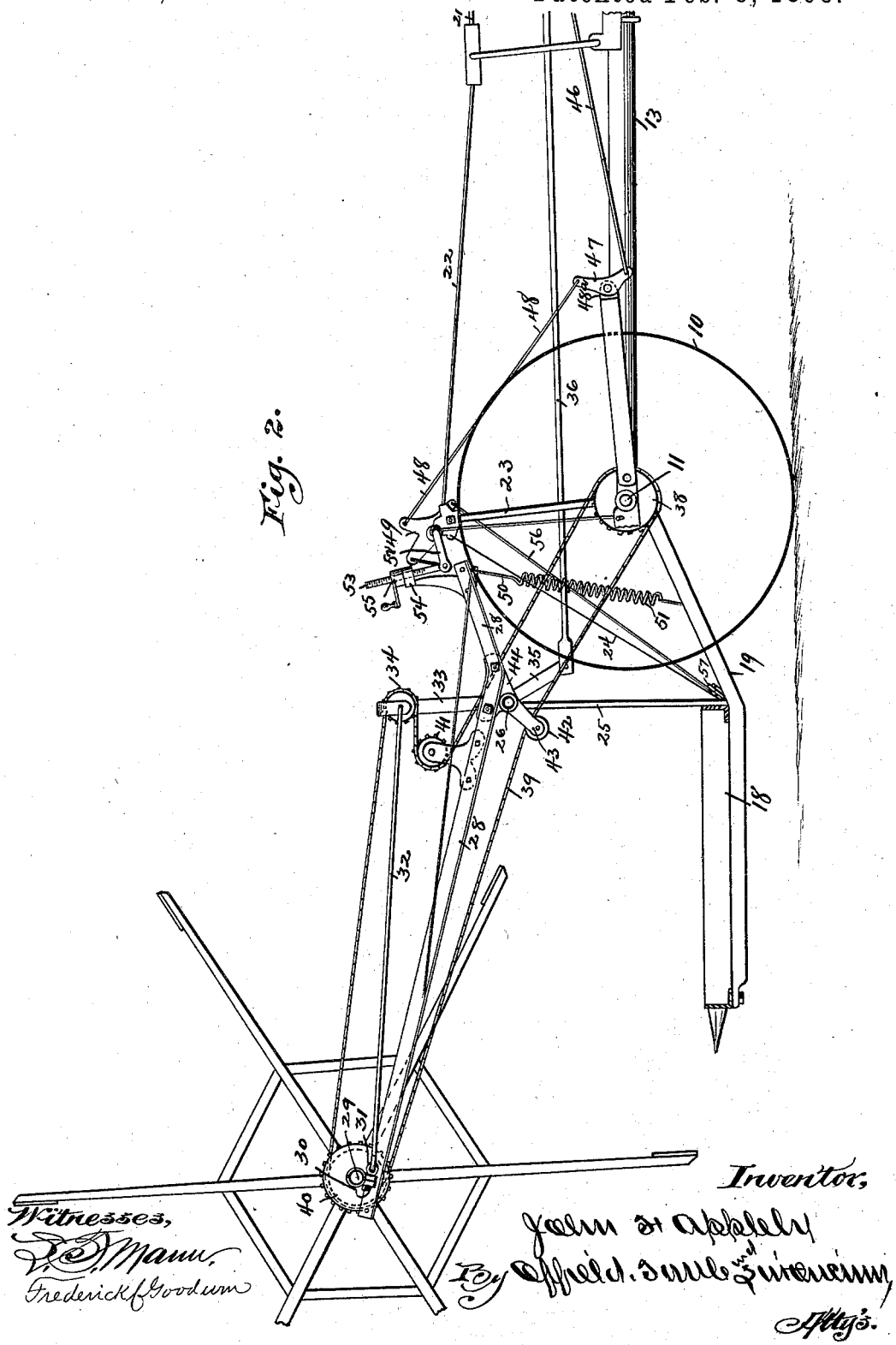
Figure 3:
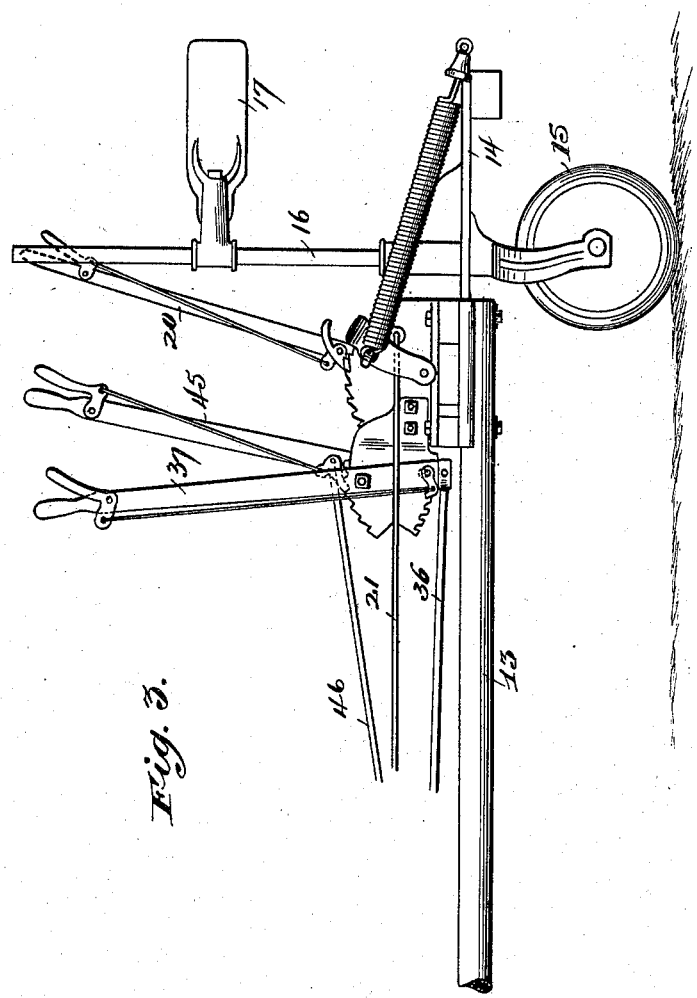
Figure 4:
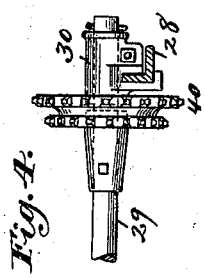

In the accompanying drawings, Figure 1 is a plan view of the machine, a section being broken out of the push-pole and parts omitted. Figs. 2 and 3, read together, give a side elevation of the same. Fig. 4 is a detail view of one of the reel-shaft bearings.

In the drawings let 10 represent the ground-wheels, and 11 their axle. On the axle I preferably mount a tubular beam 12, to which the frame of the machine is connected, so as to rock around the axle.

13 represents a push-pole connected to the tubular beam and projecting rearwardly therefrom and carrying at its rear end a driver's platform 14, supported by the usual caster-wheel 15, from the shank of which rises the steering-post 16, carrying the rudder 17. The platform is marked 18 and is carried upon the platform-arms 19, the latter being secured to the tubular beam 12 and adapted to rock with said beam around the axle. The platform may be raised or lowered through the instrumentality of the lever 20, having a main pull-rod 21, with branch pull-rods 22, connected to the top of the standards 23, and the latter being connected by the links 24 to the platform. A shaft 26 is journaled in suitable bearings, one of which may be carried by a standard 25 and the other in a socket 27 on the elevator-frame. 28 denote reel-supporting arms which have bearings upon the shaft 26 and have their rear ends extended back of said bearings. The arms 28 are preferably angle-bars, although any suitable rigid supports may be used.

The reel-shaft is marked 29 and is journaled in sliding bearings 30, said bearings being bifurcated to embrace the vertical member of the reel-bearing arm 28. An eyebolt 31, connected to the bearing, has a threaded shank of such length as to afford means for adjustment by turning up a nut on said eyebolt, and to the eye thereof are connected rods 32, which extend back to the standards 33. Said standards at their lower ends are secured to or with the shaft 26, and the standard at the binder end furnishes a support for the journal of the sprocket-wheel 34. A crank-arm 35 is secured with the shaft 26, and a rod 36 is pivotally connected to the lower end of said crank-arm and extends rearwardly to the driver's station, where it is connected to a lever 37, provided with a suitable locking mechanism, so that by manipulating the said lever the reel-bearings may be moved in and out upon the reel-supporting arms through the instrumentalities above described. By these means the reel may be moved nearer to or farther from the platform, so as to adapt the machine to cut grain of different heights or leaning grain.

The reel-shaft is driven from a sprocket-gear 38 on the axle 11, and a link belt 39, carried around said sprocket and over a sprocket 40 on the reel-shaft, passes over the intermediate take-up sprocket-gears 34 41 and the guide-sheave 42, the sprocket 34 being mounted upon the standard 33, as before described, and the sprocket 41 is conveniently mounted upon a bracket carried by the reel-bearing arm 28, and the sheave 42 may be carried upon an arm 43, forming a part of a bracket 44, which furnishes a bearing for the arms 28.

The tilting mechanism above described affords means for raising and lowering the platform and correspondingly raising and lowering the reel, while the adjusting mechanism described affords means for moving the reel bodily. It is desirable, however, to provide for an independent tilting of the reel and also for accelerating the tilting movement of the reel when the platform is tilted, and this is provided by employing a connection capable of being made rigid between the push-pole (or some part of the machine which is stationary relative to the platform and reel) and the mechanism whereby the platform and reel are tilted or raised and lowered vertically. To attain this result in the most satisfactory manner, I have provided a third lever 45 at the driver's platform and furnish it with suitable locking mechanism. A rod 46 is pivotally connected to this lever and extends forward parallel to the push-pole and is pivoted to one end of a bell-crank 47, the latter being in turn pivoted to a suitable support 48$^a$.

To the upper end of the bell-crank 47 is pivoted a thrust-rod 48, whose forward end is connected to one member of a bell-crank 49, having three arms. To one of these arms is connected a rod 50, having a spring-section, as at 51, the lower end of the rod being connected to one of the platform-carrying arms. A crank-rod 52 is journaled in the casting on the upper end of one of the standards 23 and is rigidly secured with the bell-crank 49. To one end of the crank is pivoted a threaded bolt 53, working through an apertured lug 54 and having an adjusting-nut 55 threaded thereon. The lug 54 is rigidly connected with the rear end of one of the reel-bearing arms 28.

Now if the lever 45 be locked and the platform be tilted by means of the lever 20 the reel will be moved faster than the platform, owing to the fact that the rod 46, connected to the lever 45, will operate through the thrust-rod 48 to turn the bell-crank 49 on its pivot, thus depressing or lifting upon the rear end of the reel-bearing arms 28. The spring-section 51 serves as an equalizer—a counterpoise to balance the weight of the reel and render its adjustment easy—and forms a yielding connection preventing undue strains. The spring may, however, be at any point in the line of connection—as, for example, in the rod 46 or coiled about the crank-arm 52. This mechanism therefore operates to impart an added or accelerated movement to the reel without manipulating the lever 45; but by the use of said lever the reel may be raised or lowered independently of the raising and lowering of the platform.

The foregoing description of the reel-adjusting mechanism includes only so much as is necessary to operate upon one of the reel-bearing arms; but I prefer to positively depress or raise the rear end of both of the reel-bearing arms, and to accomplish this I employ a rod 56, which is pivotally connected to a third arm of the bell-crank 49 and which may be connected to a bell-crank 57, pivoted on the rear platform and connected by a rod 58 with a bell-crank 59, pivoted on the opposite end of the platform and having one of its arms connected to the extremity of the reel-bearing arm on the grain side of the machine by means of the rod 60. By these means the thrust-rod 48, when it rocks the bell-crank 49, acts to depress or raise, as the case may be, the rear ends of both of the reel-bearing arms.

The several reel adjustments change the distance between the reel-axis and the main axle from which the reel-shaft is driven, and the intermediate sprockets, one of which is mounted upon the reel-bearing arms and the other of which is connected to the reel-frame axis, act to take up or let out the chain, so as to compensate for these several adjustments.

The several adjustments above described adapt this machine to operate in situations where it would be impracticable if they were not present. It is common, of course, to provide means for raising and lowering the platform. It is also common to provide means for raising and lowering the reel independently of or simultaneously with the platform; but it will be observed that by leaving the reel-adjusting lever locked an accelerated movement is imparted to the reel and that by manipulating said lever the reel may be raised or lowered independently of the platform, and by moving the reel bodily back and forth many other contingencies likely to occur in actual work are provided for. For example, in cutting grain where the wind is blowing in the direction the machine is advancing the grain is sometimes carried away from the sickle, which necessitates that the reel shall be moved farther out and usually lowered. When the grain leans toward the advancing sickle, then the reel should be brought back closer to the platform. The same contingencies arise with fallen or lodged grain.

Obviously the means for adjusting the reel bodily by sliding its bearings to and from the platform may be used in a machine in which the mechanism for imparting the accelerated raising and lowering movement is not present; but the combination of these several devices in the same machine will adapt it to perform work and attain results which are not merely the aggregate of the several mechanisms and which could not be secured by the separate or independent use of such mechanisms.

I claim—

1. In a harvesting-machine, the combination with reel-supporting arms, of a rock-shaft mounted therein and a reel having bearings sliding thereon, a standard carried by the shaft, a driving-chain, a sprocket carried by the standard and over which the drive-chain is passed, and rods eccentrically connected at one end to the rock-shaft and at their other ends to the reel-bearings and to an operating-lever at the driver's station respectively, substantially as described.

2. In a harvesting-machine, the combination with pivoted reel-supporting arms, of a reel mounted in sliding bearings upon said arms, a driving-chain for said reel and guides arranged eccentrically to the pivot of the reel-supporting arms, one of said guides being movable with the pivot and another with the arm, substantially as described.

3. In a harvesting-machine, the combination with pivotally-mounted reel-supporting arms, standards connected with the pivot and extending angularly therefrom, a reel having sliding bearings mounted upon the reel-supporting arms, rods connecting the outer ends of the standards with the reel-bearings, a reel-driving chain and a guide carried by one of the standards and over which the chain passes, a second guide mounted upon the reel-supporting arms and over which the chain also passes and means for rocking the reel-supporting arms on their pivots, substantially as described.

JOHN F. APPLEBY.

Witnesses:
C. C. LINTHICUM,
FREDERICK C. GOODWIN.